US009098643B2

(12) United States Patent
Cheah et al.

(10) Patent No.: US 9,098,643 B2
(45) Date of Patent: *Aug. 4, 2015

(54) MULTIPLE SERIAL PORT CONTROLLER

(71) Applicant: Intel Corporation, Santa Clara, CA (US)

(72) Inventors: Wee Hoo Cheah, Bayan Lepas (MY); Chun Hung Pang, Bukit mertajam (MY); Kuan Loon Tan, Georgetown (MY)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/134,166

(22) Filed: Dec. 19, 2013

(65) Prior Publication Data

US 2014/0108845 A1 Apr. 17, 2014

Related U.S. Application Data

(63) Continuation of application No. 12/928,334, filed on Dec. 9, 2010, now Pat. No. 8,621,129.

(51) Int. Cl.
*G06F 13/36* (2006.01)
*G06F 13/40* (2006.01)
*G06F 1/32* (2006.01)

(52) U.S. Cl.
CPC .......... *G06F 13/4031* (2013.01); *G06F 1/3253* (2013.01); *Y02B 60/1235* (2013.01)

(58) Field of Classification Search
USPC ........... 710/104–119, 305–315; 713/300–340
See application file for complete search history.

(56) References Cited

U.S. PATENT DOCUMENTS

| 5,675,813 A | 10/1997 | Holmdahl |
| 6,035,345 A | 3/2000 | Lee |
| 6,105,143 A * | 8/2000 | Kim .............................. 713/324 |
| 6,119,194 A | 9/2000 | Miranda et al. |
| 6,256,700 B1 | 7/2001 | Sauber |
| 6,516,418 B1 | 2/2003 | Lee |
| 6,601,124 B1 | 7/2003 | Blair |
| 6,792,478 B2 * | 9/2004 | Munguia et al. .................. 710/9 |
| 7,043,575 B2 | 5/2006 | Stephan |
| 7,454,630 B1 | 11/2008 | Ong et al. |

(Continued)

FOREIGN PATENT DOCUMENTS

WO  2012/078330 A1  6/2012

OTHER PUBLICATIONS

International Search Report and Written Opinion received for PCT Patent Application No. PCT/US2011/061095, mailed on May 10, 2012, 9 pages.

(Continued)

*Primary Examiner* — Raymond Phan
(74) *Attorney, Agent, or Firm* — Jordan IP Law, LLC

(57) ABSTRACT

In some embodiments, a serial bus interface circuit includes at least two serial ports, a memory to store a relationship between serial bus addresses and the at least two serial ports, and a controller to control access to the at least two serial ports. The controller may be configured to receive an access request for a serial bus address, determine a first port of the at least two serial ports corresponding to the serial bus address using the relationships stored in the memory, and disable a second port of the at least two serial ports. Other embodiments are disclosed and claimed.

18 Claims, 4 Drawing Sheets

(56) References Cited

U.S. PATENT DOCUMENTS

| | | |
|---|---|---|
| 7,685,322 B2 | 3/2010 | Bhesania et al. |
| 8,055,831 B2 * | 11/2011 | Choi et al. .................. 710/313 |
| 8,621,129 B2 * | 12/2013 | Cheah et al. ................. 710/309 |
| 2002/0103952 A1 | 8/2002 | Thompson et al. |
| 2004/0049611 A1 | 3/2004 | Kotlow et al. |
| 2005/0005178 A1 | 1/2005 | Bashford et al. |
| 2005/0091549 A1 | 4/2005 | Wu et al. |
| 2005/0154799 A1 | 7/2005 | Feng et al. |
| 2007/0192642 A1 | 8/2007 | Rothman et al. |
| 2008/0282017 A1 | 11/2008 | Carpenter et al. |
| 2009/0175393 A1 | 7/2009 | Priel et al. |
| 2009/0228730 A1 * | 9/2009 | Chin ............................ 713/324 |
| 2010/0013522 A1 | 1/2010 | Cheng |
| 2010/0042861 A1 | 2/2010 | Lee |
| 2010/0281185 A1 | 11/2010 | Takayama |
| 2010/0306565 A1 * | 12/2010 | Umedu ........................ 713/324 |
| 2011/0010477 A1 | 1/2011 | Lee et al. |
| 2012/0011384 A1 * | 1/2012 | Lee ............................... 713/323 |

OTHER PUBLICATIONS

International Preliminary Report on Patentability and Written Opinion received for PCT Patent Application No. PCT/US2011/061095, mailed on Jun. 20, 2013, 6 pages.

* cited by examiner

MULTIPLE SERIAL PORT CONTROLLER

The invention relates to power management and more particularly to a method and apparatus to reduce USB transmission power.

BACKGROUND AND RELATED ART

Many electronic devices utilize serial buses.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
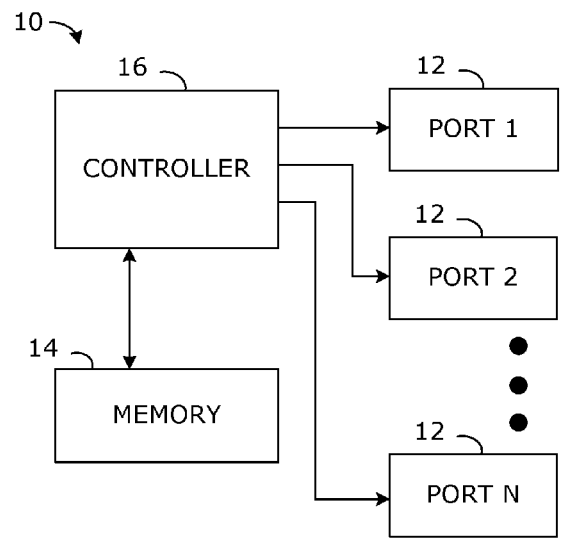
FIG. 1 is a block diagram of a serial bus interface circuit in accordance with some embodiments of the invention.

With reference to FIG. 1, in accordance with some embodiments of the invention a serial bus interface circuit 10 includes at least two serial ports 12, a memory 14 to store a relationship between serial bus addresses and the at least two serial ports 12, and a controller 16 to control access to the at least two serial ports 12. For example, the controller may be configured to receive an access request for a serial bus address, determine a first port of the at least two serial ports 12 corresponding to the serial bus address based on the relationships stored in the memory, and disable a second port of the at least two serial ports 12.

For example, the memory may include a lookup table and the controller may be configured to lookup the first port in the lookup table based on the serial bus address. In some embodiments of the invention, the controller may be a host controller and a direct access memory (DMA) engine may have access to the lookup table. For example, the lookup table may be updated when a new device is connected to the host. In some embodiments of the invention, the controller may be a hub controller and a hub state machine may have access to the lookup table. For example, the lookup table may then be updated when a new device is connected to the hub.

Figure 2:
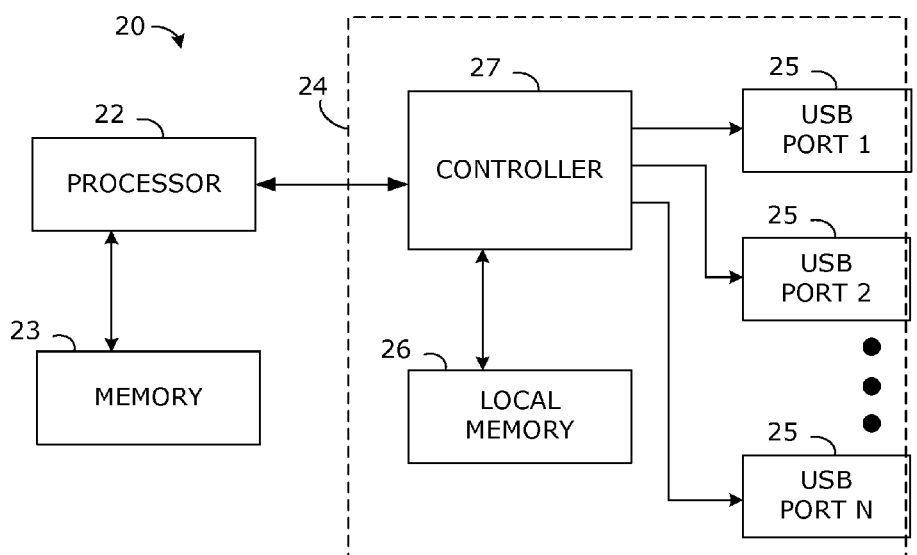
FIG. 2 is a block diagram of an electronic system in accordance with some embodiments of the invention.

With reference to FIG. 2, in accordance with some embodiments of the invention an electronic system 20 may include a processor 22, memory 23 coupled to the processor 22, and a universal serial bus (USB) interface circuit 24. For example the USB interface circuit 24 may include at least two USB ports 25, a local memory 26 to store a relationship between serial bus addresses and the at least two USB ports 25, and a controller 27 to control access to the at least two USB ports 27. For example, the controller may be configured to receive an access request for a serial bus address, determine a first USB port of the at least two USB ports 25 corresponding to the serial bus address using the relationships stored in the local memory 26, and disable a second USB port of the at least two USB ports 25.

In some embodiments of the electronic system 20, the local memory 26 may include a lookup table and the controller 27 may be configured to lookup the first USB port in the lookup table based on the serial bus address. For example, the controller 27 may be a host controller and a direct access memory (DMA) engine may have access to the lookup table. The lookup table may be updated when a new device is connected to the host. In some embodiments of the electronic system 20, the controller may be a hub controller and a hub state machine may have access to the lookup table. For example, the lookup table may then be updated when a new device is connected to the hub.

Figure 3:
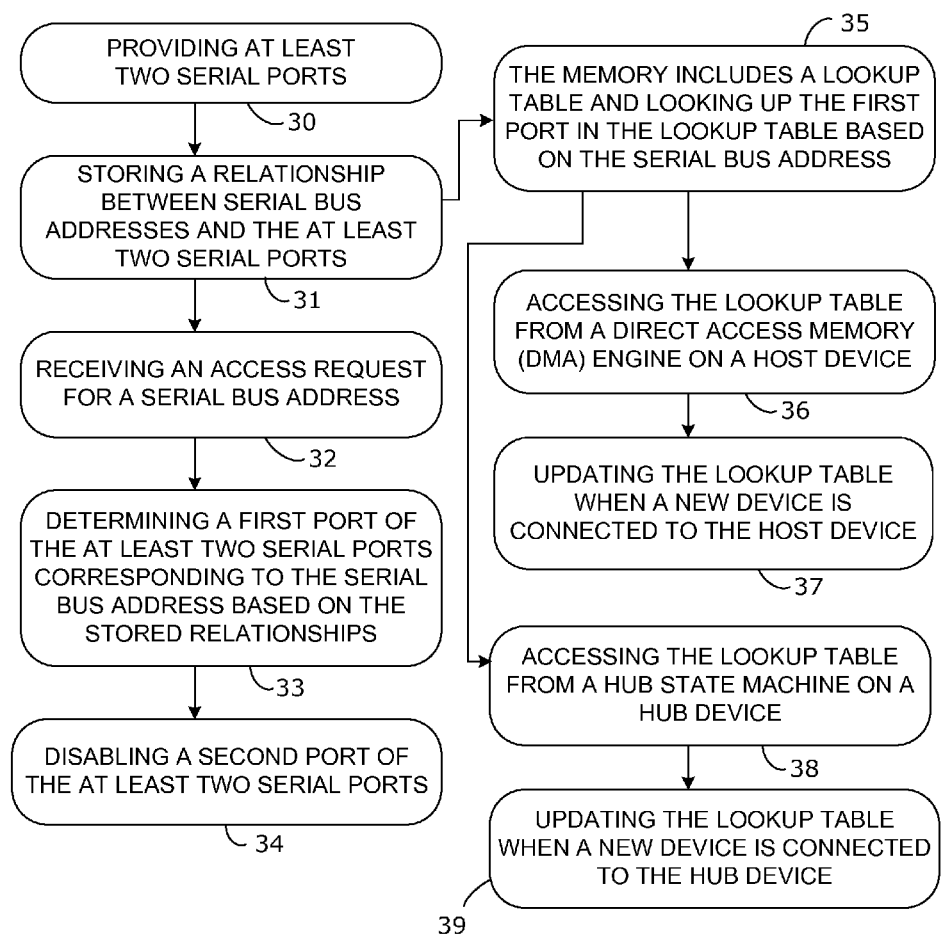
FIG. 3 is a flow diagram in accordance with some embodiments of the invention.

With reference to FIG. 3, in accordance with some embodiments of the invention, a method of operating a serial bus interface may include providing at least two serial ports (e.g. at block 30), storing a relationship between serial bus addresses and the at least two serial ports (e.g. at block 31), receiving an access request for a serial bus address (e.g. at block 32), determining a first port of the at least two serial ports corresponding to the serial bus address based on the stored relationships (e.g. at block 33), and disabling a second port of the at least two serial ports (e.g. at block 34).

For example, the memory may include a lookup table some embodiments of the invention may further include looking up the first port in the lookup table based on the serial bus address (e.g. at block 35), accessing the lookup table from a direct access memory (DMA) engine on a host device (e.g. at block 36), and/or updating the lookup table when a new device is connected to the host device (e.g. at block 37). Alternatively, some embodiments of the invention may include accessing the lookup table from a hub state machine on a hub device (e.g. at block 38) and updating the lookup table when a new device is connected to the hub device (e.g. at block 39).

By way of background and without limiting the scope of the invention, USB 1 and USB 2 architectures dictate that a host needs to broadcast the serial bus requests to all ports even though a response is required from just one port. This has caused a lot of power dissipated unnecessarily. In an example electronic system where 8 ports are available per controller, transmission to a fully populated system, 255 mW of power may be consumed versus transmission on a one port system consuming only 64 mW. In this example, about 191 mW of power is wasted. Advantageously, some embodiments of the invention may reduce the power requirements in a serial bus interface (e.g. a host and/or a hub) and still keep compatibility with many hardware and software configurations.

For example, in some embodiments of the invention a lookup table may contain all the possible USB addresses with each address indexed to its corresponding port. The lookup table may be stored in the USB host and/or hub and utilized to save power by disabling ports that do not require power to process a transaction. For example, in a host device, when a transfer descriptor is fetched with a certain address, the host controller may refer to the lookup table and disable all the ports except the port in the lookup table that corresponds to the address. For example, in a hub device, when a packet is received from upstream port, the hub controller may refer to the lookup table and disable all the ports except the port in the lookup table that corresponds to the address in the packet.

The lookup table may be periodically updated or otherwise updated as needed. For example, the lookup table may be programmed every time a device is plugged in. For example, a USB driver may be configured to program the lookup table every time a device is enumerated. Alternatively, for a virtualization engine, the engine can trap the enumeration and program the lookup table accordingly. Advantageously, backward compatibility is maintained because even if the software driver is not configured in accordance with the power saving features of the present invention, the hardware will still run, just without the power saving. Advantageously, some embodiments of the present invention may prevent transmission to the non-relevant ports while adhering to the USB specification.

Figure 4:
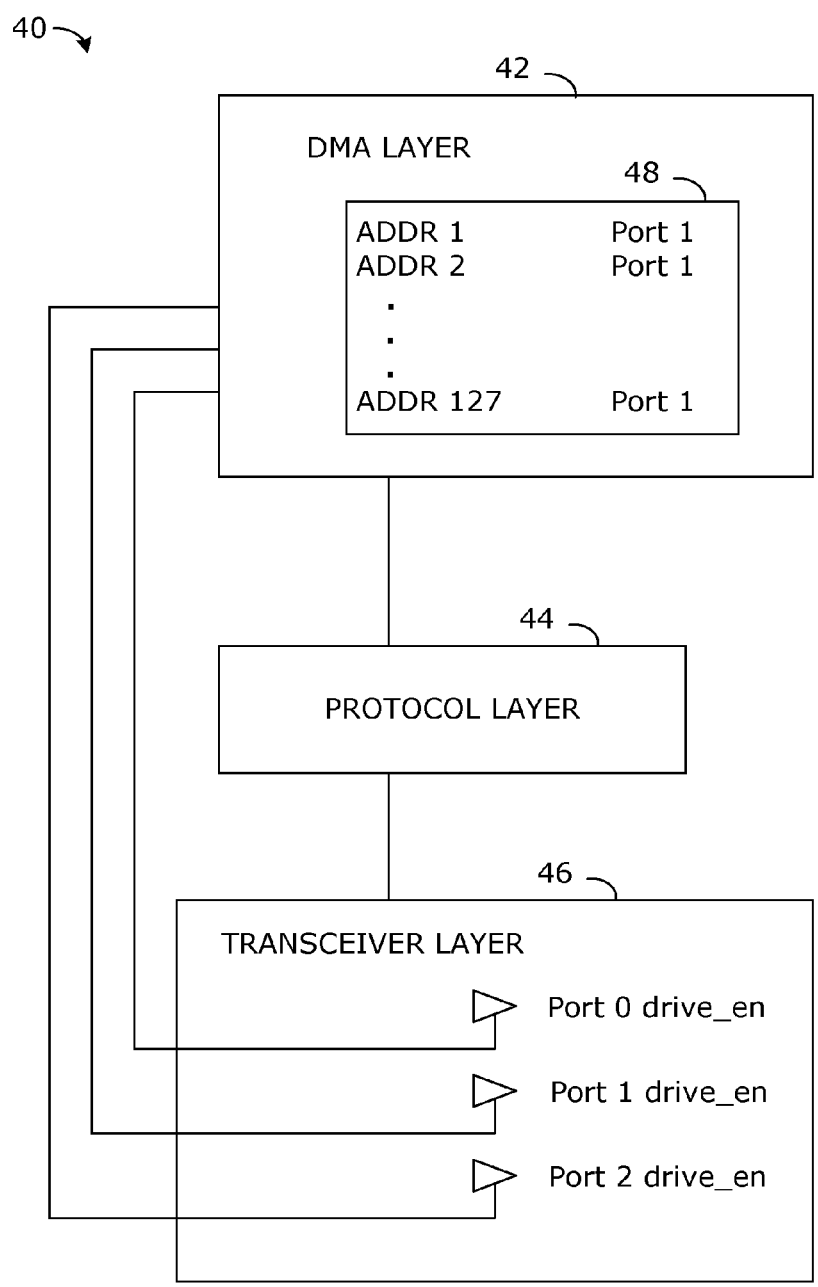
FIG. 4 is a block diagram of another serial bus interface circuit in accordance with some embodiments of the invention.

With reference to FIG. 4, a host device 40 in accordance with some embodiments of the invention may include a DMA layer 42, a protocol layer 44, and a transceiver layer 46. The DMA layer 42 may have access to a lookup table 48 which maps addresses to ports. In many conventional systems, the address port relationship is abstracted from the DMA engine at a later point. For example, the DMA engine may know what address to send, but not which port to send to. Advantageously, some embodiments of the invention may provide the DMA engine with the information and also provide a communication path to the transceiver layer 46 to shut off non-relevant ports before transmitting data, thereby saving power.

Figure 5:
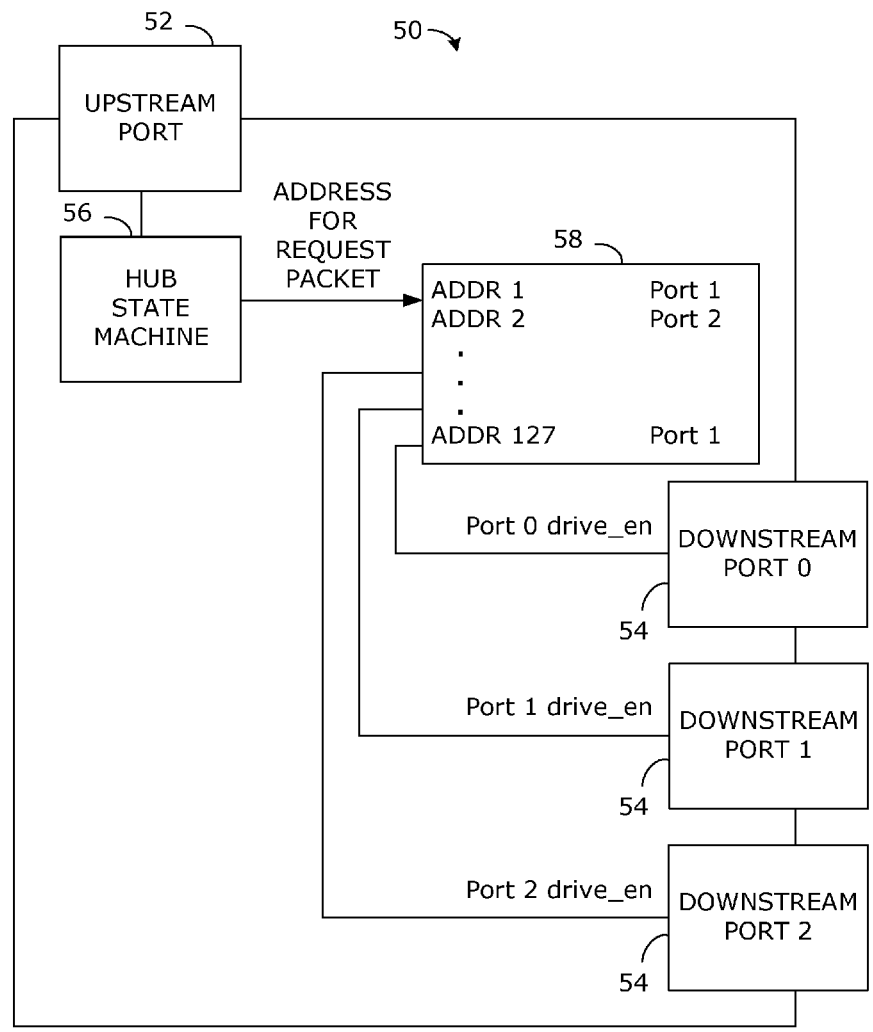
FIG. 5 is a block diagram of another serial bus interface circuit in accordance with some embodiments of the invention.

With reference to FIG. 5, a hub device 50 in accordance with some embodiments of the invention may include an upstream port 52 connected with at least two downstream ports 54. A hub state machine 56 may receive an access request and use the address of the request packet to index a lookup table 58. The lookup table 58 outputs a port enable signal to the downstream port 54 which corresponds to the entry in the lookup table 58 indexed by the address for the request packet. The other downstream ports may be disabled, thereby saving power.

Advantageously, reducing power in the USB interface may effectively lower the Thermal Design Power (TDP) for an electronic system. For example, lower TDP may help facilitate reduced cooling requirements and fanless or heatsinkless products to be able to fit into a smaller form factor. Advantageously, some embodiments of the invention may extend battery life by reducing power.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A serial bus interface circuit, comprising:
   at least two serial ports;
   a memory to store a relationship between serial bus addresses and the at least two serial ports; and
   a controller to control access to the at least two serial ports, wherein the controller is configured to:
   receive an access request for a serial bus address;
   determine a first port of the at least two serial ports corresponding to the serial bus address using the relationships stored in the memory; and
   disable a second serial port of the at least two serial ports to prevent transmission to the second serial port.

2. The serial bus interface circuit of claim 1, wherein each serial port of the at least two serial ports not corresponding to the serial bus address are to be disabled.

3. The serial bus interface circuit of claim 1, wherein data is to be transmitted to the first serial port and not the second serial port.

4. The serial bus interface circuit of claim 1, wherein a port enable signal is to be output to the first serial port.

5. The serial bus interface circuit of claim 1, wherein the controller is to use the serial bus address from a packet to determine the first port and to disable the second port.

6. The serial bus interface circuit of claim 1, wherein the controller is to use the serial bus address from a transfer descriptor to determine the first port and to disable the second port.

7. The serial bus interface circuit of claim 3, wherein the second serial port is to be shut off before the data is to be transmitted.

8. A method of operating a serial bus interface, comprising:
   providing at least two serial ports;
   storing a relationship between serial bus addresses and the at least two serial ports;
   receiving an access request for a serial bus address;
   determining a first port of the at least two serial ports corresponding to the serial bus address based on the stored relationships; and
   disabling a second serial port of the at least two serial ports to prevent transmission to the second serial port.

9. The method of claim 8, further including disabling each serial port of the at least two serial ports not corresponding to the serial bus address.

10. The method of claim 8, further including transmitting data to the first serial port and not the second serial port.

11. The method of claim 10, further including shutting off the second serial port before the data is transmitted.

12. The method of claim 8, further including outputting a port enable signal is to the first serial port.

13. An electronic system, comprising:
    a processor;
    memory coupled to the processor; and
    a universal serial bus (USB) interface circuit including:
    at least two USB ports;
    a local memory to store a relationship between serial bus addresses and the at least two USB ports; and
    a controller to control access to the at least two USB ports, wherein the controller is configured to:
    receive an access request for a serial bus address;
    determine a first USB port of the at least two USB ports corresponding to the serial bus address using the relationships stored in the local memory; and
    disable a second USB port of the at least two USB ports to prevent transmission to the second USB port.

14. The electronic system of claim 13, wherein each USB port of the at least two USB ports not corresponding to the serial bus address are to be disabled.

15. The electronic system of claim 13, wherein data is to be transmitted to the first USB port and not the second USB port.

16. The electronic system of claim 13, wherein a port enable signal is to be output to the first USB port.

17. The electronic system of claim 15, wherein the second USB port is to be shut off before the data is to be transmitted.

18. The serial bus interface of claim 5, wherein the packet is to be received from a port upstream to the at least two serial ports.

\* \* \* \* \*